United States Patent

Mironets

(10) Patent No.: US 9,925,723 B2
(45) Date of Patent: Mar. 27, 2018

(54) ADDITIVE MANUFACTURING SYSTEMS AND METHODS

(71) Applicant: Delavan Inc, West Des Moines, IA (US)

(72) Inventor: Sergey Mironets, Charlotte, NC (US)

(73) Assignee: Delavan Inc., West Des Moines, IA (US)

( * ) Notice: Subject to any disclaimer, the term of this patent is extended or adjusted under 35 U.S.C. 154(b) by 235 days.

(21) Appl. No.: 14/670,991

(22) Filed: Mar. 27, 2015

(65) Prior Publication Data

US 2016/0279705 A1    Sep. 29, 2016

(51) Int. Cl.
| | |
|---|---|
| *B29C 67/00* | (2017.01) |
| *B33Y 30/00* | (2015.01) |
| *B33Y 50/02* | (2015.01) |
| *B22F 3/105* | (2006.01) |

(52) U.S. Cl.
CPC ...... *B29C 67/0088* (2013.01); *B29C 67/0077* (2013.01); *B33Y 30/00* (2014.12); *B33Y 50/02* (2014.12); *B22F 2003/1057* (2013.01); *Y02P 10/295* (2015.11)

(58) Field of Classification Search
CPC .................................................. B29C 67/0077
See application file for complete search history.

(56) References Cited

U.S. PATENT DOCUMENTS

| | | | | |
|---|---|---|---|---|
| 5,837,960 | A * | 11/1998 | Lewis | B23K 26/34 219/121.63 |
| 6,824,714 | B1 * | 11/2004 | Turck | B29C 67/0077 264/308 |
| 2009/0130449 | A1 * | 5/2009 | El-Siblani | A61C 13/0013 428/409 |
| 2011/0049739 | A1 * | 3/2011 | Uckelmann | A61C 13/0013 264/16 |
| 2012/0211155 | A1 * | 8/2012 | Wehning | A61C 13/0013 156/275.5 |
| 2013/0015609 | A1 * | 1/2013 | Landau | B29C 67/0077 264/497 |
| 2015/0290710 | A1 * | 10/2015 | Ackelid | B29C 67/0077 419/30 |

FOREIGN PATENT DOCUMENTS

DE             19952998 A1 *   5/2001   .............  B29C 41/12

* cited by examiner

*Primary Examiner* — Ryan M Ochylski
(74) *Attorney, Agent, or Firm* — Locke Lord LLP; Scott D. Wofsy; Christopher J. Cillié

(57) ABSTRACT

An additive manufacturing system includes a build platform and an illuminator disposed on opposite sides of a powder carrier relative to gravity. The powder carrier has a movement envelop that intersects the beam path and includes a material that is translucent to radiation emitted by the illuminator such that the emitted radiation traverses the powder carrier and fuses powder from a powder bed carried by the powder carrier with a substrate overlying the powder carrier and suspended from the build platform.

9 Claims, 5 Drawing Sheets

ADDITIVE MANUFACTURING SYSTEMS AND METHODS

BACKGROUND OF THE INVENTION

1. Field of the Invention

The present disclosure relates to additive manufacturing techniques, and more particularly to powder bed fusion additive manufacturing techniques.

2. Description of Related Art

Additive manufacturing (AM) or additive manufacturing layer manufacturing (ALM) processes are commonly used to fabricate structures by adding successive layers to an underlying substrate. AM and ALM processes typically involve charging a powder bed housing a substrate with powder and selectively fusing a portion of the powder as a layer to the substrate, generally with a heat source like a laser, e-beam, or welding device. Once the layer has been developed over the substrate the substrate is withdrawn into the powder bed, the powder bed re-charged with additional powder, and a successive layer fused to the layer previously added to the substrate. The powder generally includes a metal, ceramic, or plastic material of relatively fine consistency and which is readily deposited into the powder using a re-coater device. The re-coater device is typically a blade or roller type device that is operable to displace powder from the a powder source (i.e. a powder reservoir) to the powder bed where, upon delivery, the powder joins residual powder previously delivered to the powder bed and not fused to the underlying substrate when prior layer was added to the substrate. Once the final layer has been added to the structure, the structure is removed from the powder bed for subsequent processing.

Such conventional systems and methods have generally been considered satisfactory for their intended purpose. However, there remains a need in the art for improved additive manufacturing techniques. The present disclosure provides a solution for this need.

SUMMARY OF THE INVENTION

An additive manufacturing system includes a build platform and an illuminator disposed on opposite sides of a powder carrier relative to gravity. The powder carrier has a movement envelop that intersects the beam path and includes a material that is translucent to radiation emitted by the illuminator such that the emitted radiation traverses the powder carrier and fuses powder from a powder bed carried by the powder carrier with a substrate overlying the powder carrier and suspended from the build platform.

In certain embodiments, the powder carrier movement envelope can include a first powder carrier position and a second powder carrier position. In the first position the powder carrier can intersect the beam path while the illuminator emits radiation. In the second position the powder carrier can be outside the beam path in the second position. A conveyor or a revolver can be operatively associated with the powder carrier to move the powder carrier between the first and second positions. A powder source can be proximate to the powder carrier second position to deposit a powder bed on the powder carrier while in the second position, such as with a re-coater with a movement envelop outside of the beam path.

In accordance with certain embodiments, the system can include an indexer. The indexer can be coupled to the build platform to displace the substrate upwards relative to gravity as layers are successively added to the bottom of the substrate while suspended from the build platform. The illuminator can includes a scanning mirror disposed along the beam path to selectively displace the beam path laterally across a bottom surface of the substrate. The illuminator can include a focus element disposed along the beam path to focus or defocus radiation at a location disposed between the powder carrier and the build platform, such as at an interface of the substrate and the powder bed.

It is also contemplated that in accordance with certain embodiments the system can include a processor and a memory. The processor can be operatively associated with one or more of the powder carrier, illuminator, scanning mirror, and build platform. The memory can be communicative with the processor and have recorded on the memory program modules with instructions that, when read by the processor cause the processor to move the powder carrier to the first position, fuse powder from the powder bed to the overlying substrate using the laser, and move the powder carrier to the second position. It is also contemplated that the instructions can cause the powder source to deposit powder with a first composition on the powder carrier prior to moving the powder carrier to the first position, and deposit powder with a second composition different from the first on the powder carrier after moving the powder carrier to the second position.

An additive manufacturing system includes a build platform as described above, a powder carrier disposed below the build platform relative to gravity, a scanning mirror, and an illuminator. The scanning mirror is disposed at an end of a beam path intersecting the powder carrier from below the powder carrier such that radiation emitted from the scanning mirror traverses the powder carrier and fuses powder from a powder bed carried by the powder carrier with a substrate overlying the powder carrier and suspended from the build platform.

A method of fabricating a layered structure includes depositing powder on a powder carrier, moving the carrier to a first position, fusing powder to an overlying substrate using radiation received through the carrier (i.e., from below the powder carrier), moving the powder carrier to a second position, depositing additional powder on the powder carrier.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
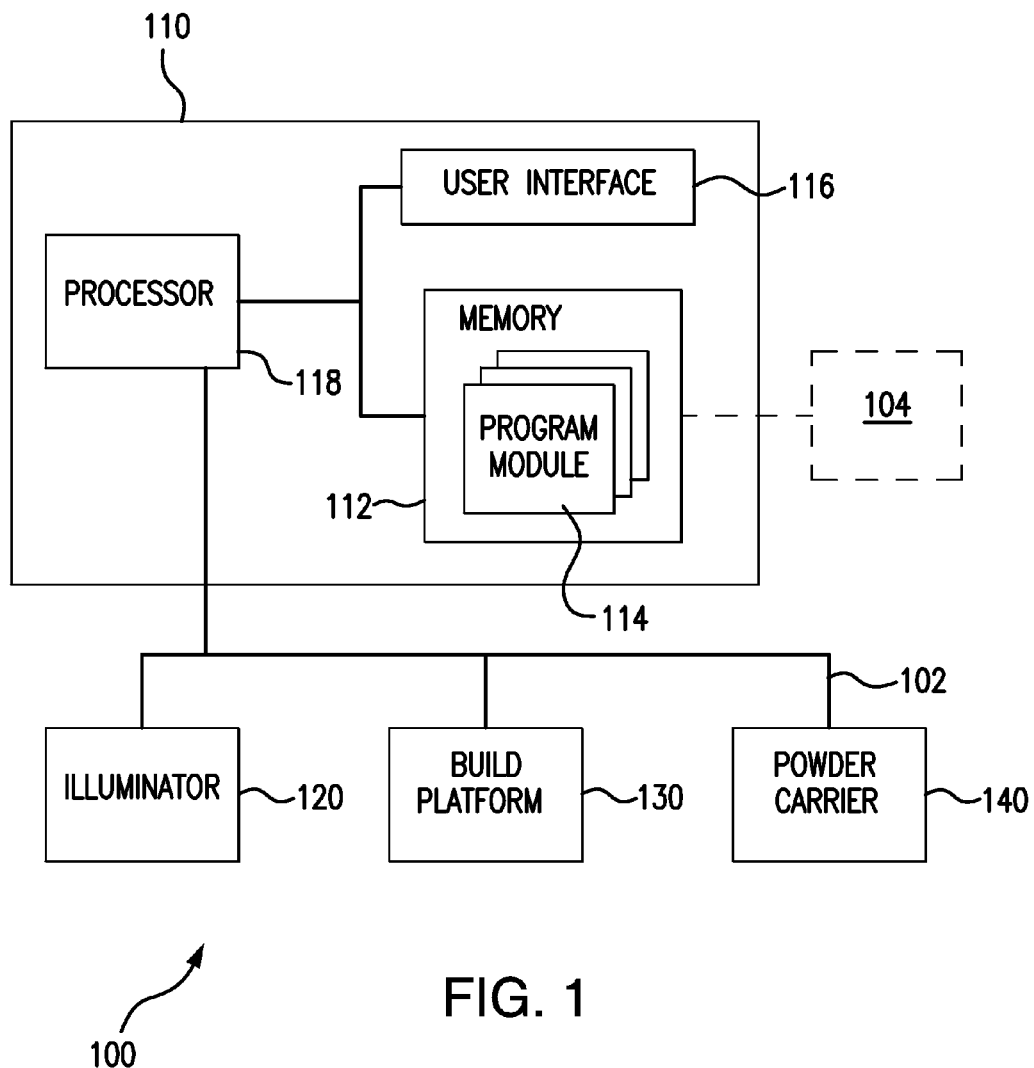
FIG. 1 is a schematic view of an exemplary embodiment of an additive manufacturing system constructed in accordance with the present disclosure, showing a controller operatively associated with an illuminator, a build platform, and a power carrier.

Reference will now be made to the drawings wherein like reference numerals identify similar structural features or aspects of the subject disclosure. For purposes of explanation and illustration, and not limitation, a partial view of an exemplary embodiment of an additive manufacturing system in accordance with the disclosure is shown in FIG. 1 and is designated generally by reference character 100. Other embodiments of additive manufacturing systems in accordance with the disclosure, or aspects thereof, are provided in FIGS. 2-5, as will be described. The systems and methods described herein can be used for fabricating structures, such as fuel nozzles and gas turbine engine blades, using additive manufacturing techniques.

With reference to FIG. 1, additive manufacturing system 100 is shown. Additive manufacturing system 100 generally includes a controller 110, an illuminator 120, a build platform 130, and a powder carrier 140. Controller 110 includes a memory 112, a user interface 116, and a processor 118. User interface 116 and memory 112 are both communicative with processor 118. Processor 118 is operatively connected to illuminator 120, build platform 130, and powder carrier 140 through a communication bus 102. Memory 112 has a plurality of program modules 114 recorded thereon that, when read by processor 118, cause processor 118 to undertake certain actions as described below.

Figure 2:
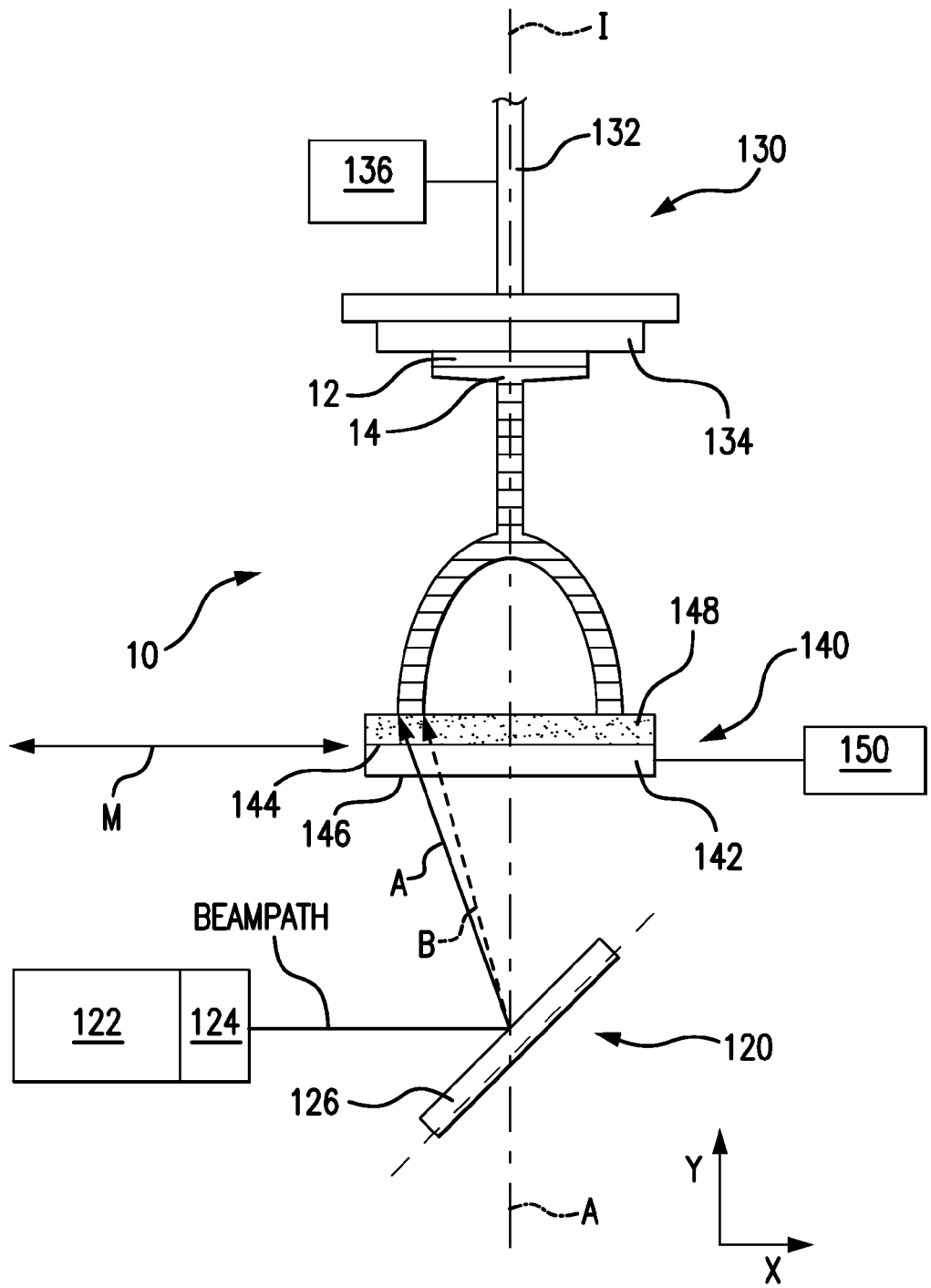
FIG. 2 is a schematic view of the additive manufacturing system of FIG. 1, showing a layered substrate suspended from the build platform and above the powder carrier.

With reference to FIG. 2, additive manufacturing system 100 is shown. Relative to the direction of gravity, build platform 130 is disposed above powder carrier 140. Illuminator 120 (including a scanning mirror 126) is disposed at an end of a beam path opposite powder carrier 140 and build platform 130. In the exemplary illustrated embodiment, scanning mirror 126 is disposed below both build platform 130 and powder carrier 140 relative to the direction of gravity.

Build platform 130 includes a shaft 132 coupled to a build plate 134. A component 10 is fused build plate 134 and is suspended over powder carrier 140 relative to gravity, build plate 134 serving as a substrate for successively added layers of component 10. An indexer 136 is operatively coupled to build platform 130 for displacing build plate 134 (and component 10) upwards and downwards relative to gravity and in relative to powder carrier 140 along an indexing axis I. Indexer 136 can include a motor and gear arrangement or other mechanism suitable for driving build platform 130 towards and away from powder carrier 140 along movement axis I.

Component 10 includes a first layer 12 and at least one second layer 14. First layer 12 and second layer 14 may include a plurality of layers. First layer 12 is fused to build plate 134 using laser radiation emitted by a laser source 122 and directed by scanning mirror 126 to form an integral structure including build plate 134 and first layer 12. Subsequent layers are thereafter successively added to a bottom surface of build plate 134 relative to gravity by fusing a portion of a powder bed arranged along axis I.

In embodiments, successive layers are formed using discrete powder beds. This enables forming a functionally graded structure with layers of different compositions. For example, first layer 12 can be formed from a powder bed having a first composition and second layer 14 can be formed from a powder bed having a second composition, the second composition being different from the first composition.

Powder carrier 140 is disposed between illuminator 120 and build platform 130 and is movable within a movement envelope M between a first and second positions (shown in FIG. 4) relative to component 10. Powder carrier 140 includes a carrier body 142 with an upper surface 144 and an opposed lower surface 146. A powder bed 148 is disposed on upper surface 144 of carrier body 142. Carrier body 142 includes a material that is translucent or substantially transparent to radiation emitted by illuminator 120. This allows the radiation to traverse carrier body 142 from lower surface 146 to upper surface 144 where the radiation fuses a portion of powder bed 148 to substrate as new layer. As will be appreciated, successive fusion of layers of powder to substrate enables construction of substrate in a layer wise manner, such as in a solid freeform technique wherein three-dimensional objects are produced by layer by layer technique or by deposition of individual solid, liquid or semi-solid portions of a material on specific regions of an object according to a digital model stores in the memory of a computer-controlled deposition apparatus.

Illuminator 120 includes laser source 122, a focus element 124, and a scanning mirror 126. Focus element 124 is optically coupled to laser source 122 along the beam path for focusing or defocusing radiation at a location disposed between powder carrier 140 and build platform 130. This allows for radiation can be concentrated at an interface between component 10 and powder bed 148 for selectively fusing powder from powder bed 148 to component 10.

Scanning mirror 126 is disposed along the beam path for selectively displacing the beam path laterally across a bottom surface of component 10. This arrangement allows for selectively fusing powder arrangement below component 10 to component 10. For example, as illustrated in FIG. 2 for purposes of illustration and not for limitation, scanning mirror 126 is configured to change the beam path orientation relative to component 10 between path A and path B, thereby selectively fusing powder from a region of powder bed 148 to component 10 bounded be the intersection of path A and path B with powder bed 148 using radiation transmitted through carrier body 142 from lower surface 146 to upper surface 144.

Figure 3:
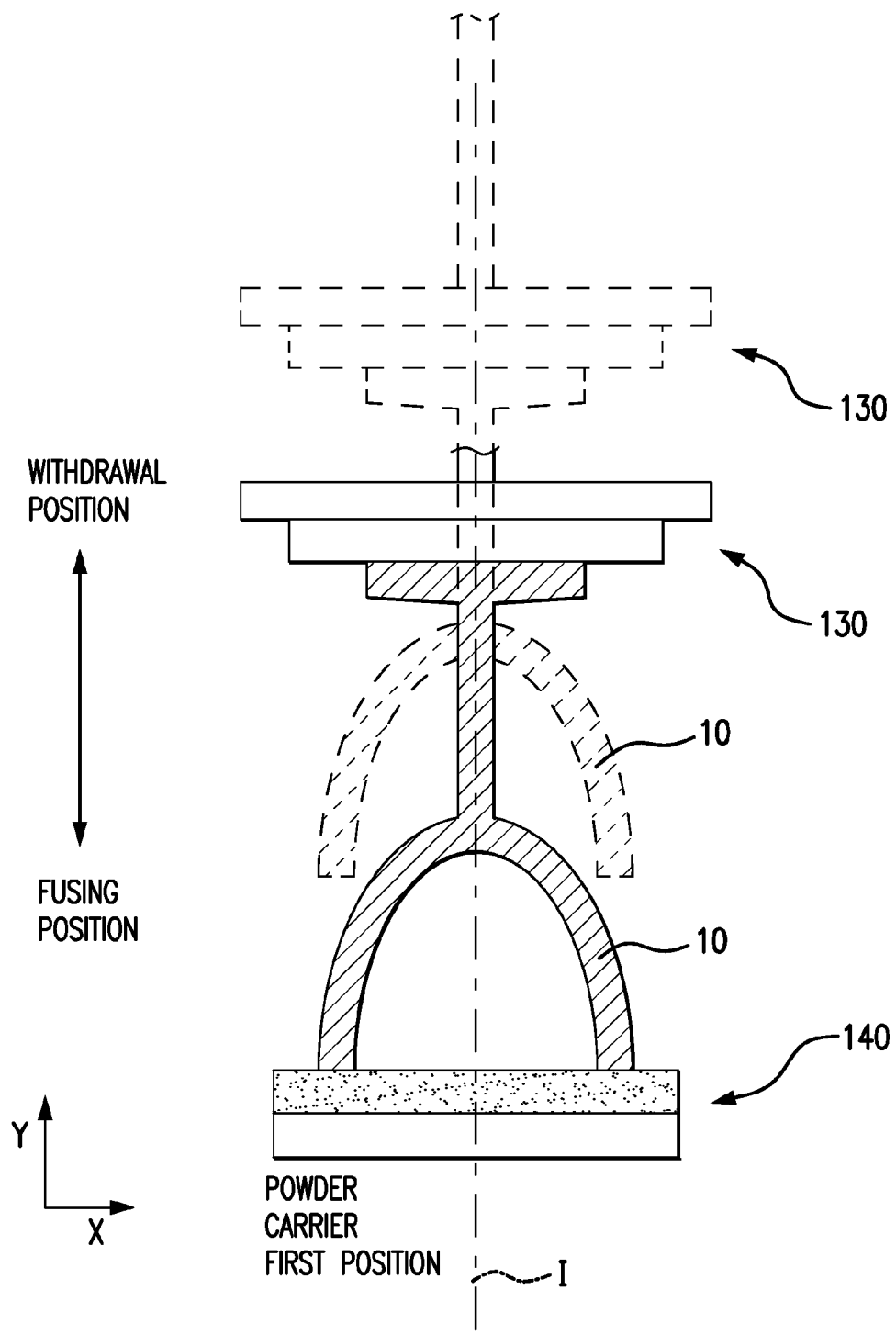
FIG. 3 is schematic view of the build platform of FIG. 1, showing the build platform in a fusing position and a withdrawal position in relation to the powder carrier.

With reference to FIG. 3, build platform 130 and powder carrier 140 are shown. Indexer 136 (shown in FIG. 2) is operable to displace build platform 130 vertically, relative to gravity, along axis I between a fusing position (shown in solid outline) and a withdrawal position (shown in dashed outline). In the fusing position, substrate is proximate powder carrier 140 such that powder disposed overtop powder carrier 140 can be fused using radiation provided from below powder carrier 140. In the withdrawal position, substrate is displaced from powder carrier 140 such that a gap separates a lowermost layer of substrate from powder disposed overtop powder carrier 140.

Figure 4:
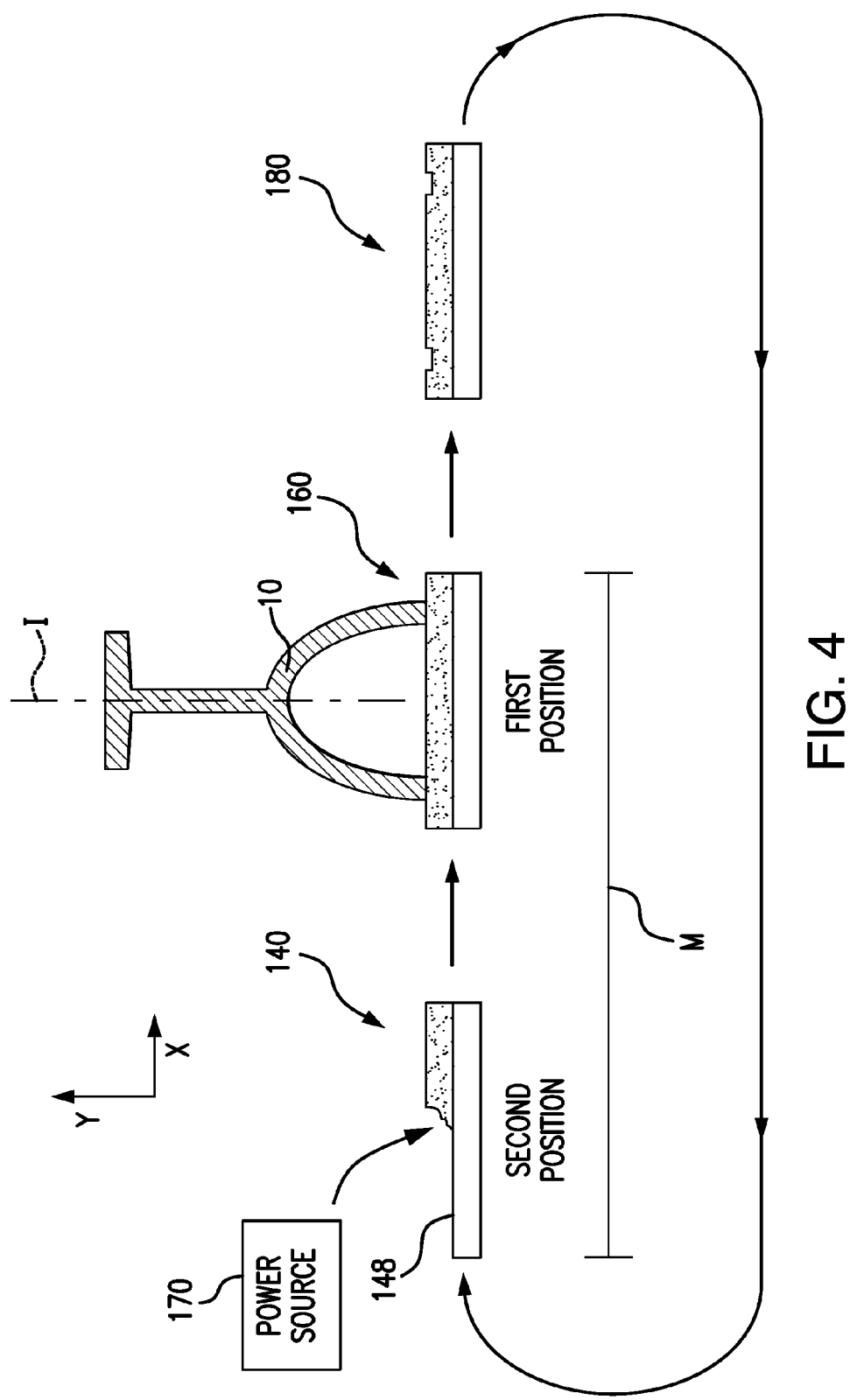
FIG. 4 is a schematic view of the powder carrier of FIG. 1, showing the powder carrier in a first position for fusing a layer to an overlying substrate and in a second position for receiving a charge of powder from a powder source.

With reference to FIG. 4, powder carrier movement envelope M is shown. Movement envelope M includes a powder carrier first position and a powder carrier second position. In the first position, powder carrier 140 intersects the beam path while illuminator 120 (shown in FIG. 2) emits radiation. In the second position, powder carrier 140 is outside the beam path and does not intersect the beam path. This allows a second powder carrier 160 to be disposed in the beam path and under component 10, thereby allowing layer fusing to continue while a first powder carrier, e.g. powder carrier 140, has a powder bed emplaced on upper surface 144.

Movement of powder carrier 140 between first and second positions can be effected a conveyor or a carousel device 150. Conveyor or carousel device 150 is operatively connected to powder carrier 140 to move powder carrier 140 relative to axis I. It is contemplated that conveyor or carousel device 150 can be operatively associated with more than one powder carrier 140 (e.g., a second powder carrier 160 and a third powder carrier 180) to shuttle the powder carriers sequentially under component 10. This allows decouples the activities necessary to load powder on the powder carriers from the fusing operation involving an individual carrier. For example, a first power carrier 140 can be receiving powder from a powder source 170 in the second position while second powder carrier 160 is in the first position and receiving laser radiation for fusing powder to component 10. Optionally, a third powder carrier 180 may be queued for receiving additional powder for yet another fusing operation.

Powder source 170 can be proximate to the powder carrier second position and operable to deposit a powder bed on powder carrier 140 while in the second position. It is contemplated that powder source 170 can include a parallel re-coater, the parallel re-coater operable independent of fusing occurring in the first position and arranged for successively preparing powder beds on first and second powder carriers as they successively return to their second positions subsequent to fusing events. Powder layer preparation may include mechanical recoating systems for spreading and compacting powder as well as utilizing other techniques including but not limited to electro-coating, electrodeposition, electrophoretic deposition and other deposition processes that provide uniform powder layer deposition without limiting powder recyclability (i.e. particle plastic deformation and excessive powder bed fusion to the upper surface 144 of powder carrier 140

Figure 5:
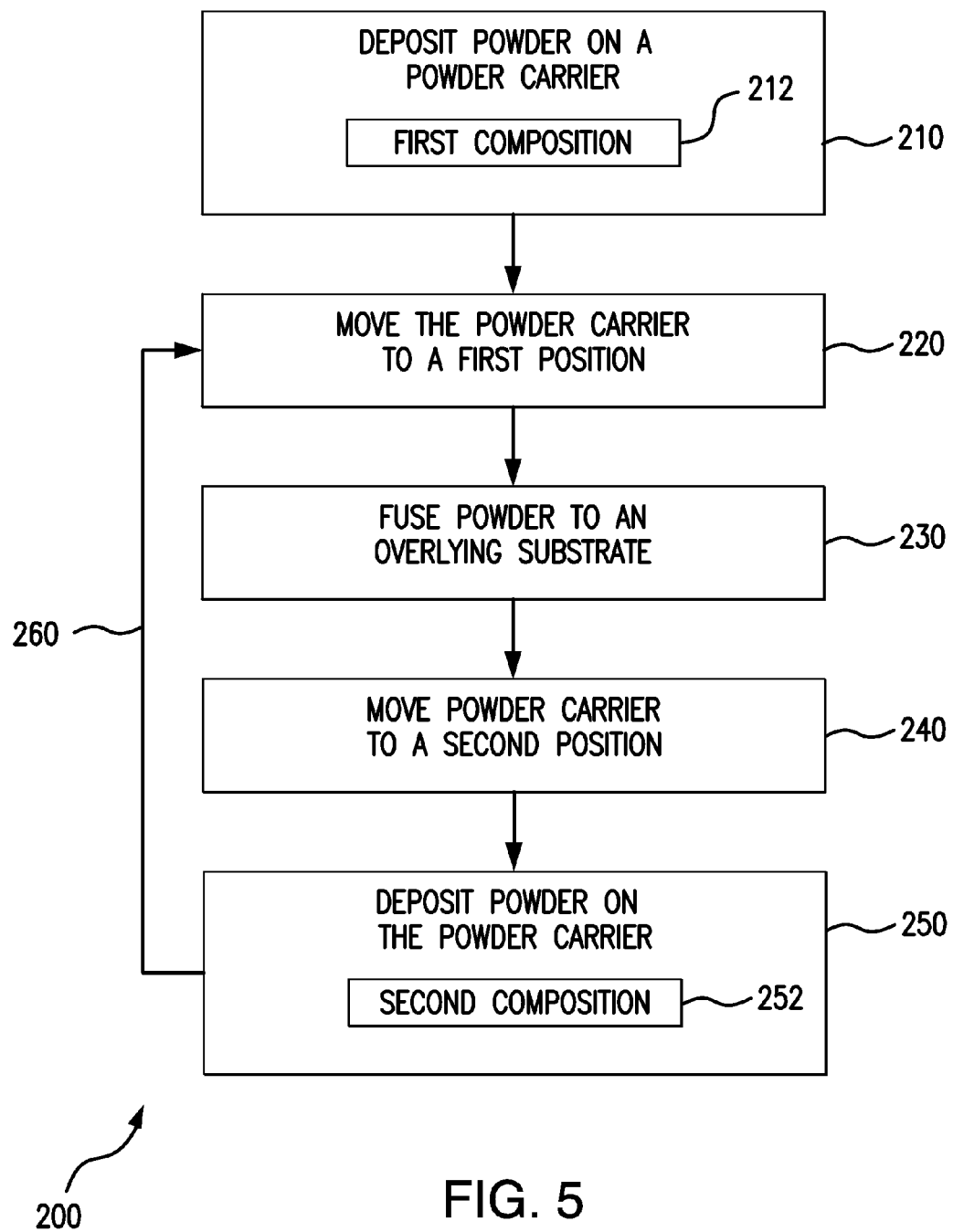
FIG. 5 shows a method of making a structure by adding layers to a substrate formed by fusing powder from a powder bed, fusing occurring at power carrier first position and powder bed coating occurring at a second powder carrier position.

With reference to FIG. 5, a method 200 of fabricating a structure using an additive manufacturing technique is shown. Method 200 includes depositing a powder bed on a powder carrier, e.g. powder carrier 140, while the powder carrier is in a second position, as shown with box 210. Once the powder bed is established, the powder carrier and powder bed is moved to the powder bed first position, e.g. using a conveyor or carousel device 150, as shown with box 220. There powder from the powder bed is fused to an overlying substrate, e.g. component 10, shown with box 230. Fusing can be done using an electron or laser beam provided from an illuminator, e.g. illuminator 120, received from below the powder carrier relative to gravity. Thereafter the powder carrier can be returned to the second position and the powder bed refreshed or replaced using a powder source, e.g. powder source 170, as shown with boxes 240 and 250.

Returning to FIG. 1, User interface 116 preferably includes an input device, such as a keyboard, a touch screen or a speech recognition subsystem, which enables a user to communicate information and command selections to processor 118. User interface 116 may also include an output device such as a display, e.g., a multi-function display. User interface 116 may also further include an input device such as a mouse, track-ball, or joystick, which allows a user to manipulate the display for communicating additional information and command selections to processor 118.

Processor 118 is preferably an electronic device configured of logic circuitry that responds to and executes instructions. Memory 112 is preferably a computer-readable medium encoded with a computer program. In this regard, memory 112 stores data and instructions readable and executable by processor 118 for controlling the operation of processor 118. Memory 112 may be implemented in a random access memory (RAM), a hard drive, a read only memory (ROM), or a combination thereof.

Program module 114 contains instructions for controlling processor 118 to execute the methods described herein. For example, under control of program module 114, processor 118 issues instructions to illuminator 120, build platform 130, and powder carrier 140 in concert with one another to successively fuse layers to a component 10 (shown in FIG. 2) suspended from build platform 130. Program module 114 can also include geometric information relating to structure. It is to be appreciated that the term "module" is used herein to denote a functional operation that may be embodied either as a stand-alone component or as an integrated configuration of a plurality of sub-ordinate components. Thus, program module 114 may be implemented as a single module or as a plurality of modules that operate in cooperation with one another. Moreover, although program module 114 is described herein as being installed in memory 112, and therefore being implemented in software, it could be implemented in any of hardware (e.g., electronic circuitry), firmware, software, or a combination thereof.

Processor 118 outputs, to user interface 116, a result of an execution of the methods described herein. Alternatively, processor 118 could direct the output to a remote device (not shown), via a network connected to communications bus 102. It is also to be appreciated that while program module 114 is indicated as already loaded into memory 112, it may be configured on a storage medium 104 for subsequent loading into memory 112. Storage medium 104 is also a computer-readable medium encoded with a computer program, and can be any conventional storage medium that stores program module 114 thereon in tangible form. Examples of storage medium 104 include a floppy disk, a compact disk, a magnetic tape, a read only memory, an optical storage media, universal serial bus (USB) flash drive, a solid-state storage (SSD), a compact flash card, or a digital versatile disc. Alternatively, storage medium 104 can be a random access memory, or other type of electronic storage, located on a remote storage system and coupled to controller 110 via a network.

It is further to be appreciated that although the systems and methods described herein can be implemented in software, they could be implemented in any of hardware (e.g., electronic circuitry), firmware, software, or a combination thereof. It is also to be appreciated that at least one program module 114 can include information describing a structure three-dimensionally for fabrication using additive manufacturing system 100.

In embodiments described herein there is no powder bed or requirement to load and/or unload a powder bed. In certain embodiments, loading powder on the powder carrier occurs outside of the beam path. This can reduce system cycle time by allowing additional powder carriers to cycle through their respective first positions and reducing the time interval between successive layer fusing events. Adding layers to the bottom of the substrate instead of the top of the structure can reduce the likelihood of powder entrapment within the substrate, thereby reducing (or eliminating) the need to remove unused powder from the substrate subsequent to the fusing operations. Moreover, because separate charges can be conveyed to the substrate cyclically, the material of the powder used to form the substrate can be changed on a layer by layer basis, thereby allowing for the construction of functionally graded substrates wherein the composition of the resulting structure varies between layers.

The methods and systems of the present disclosure, as described above and shown in the drawings, provide for additive manufacturing systems with superior properties including improved cycle time and/or the capability to incorporate multiple material with tailored properties into substrates produced using the system. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An additive manufacturing system, comprising:
   an illuminator and a build platform disposed on opposite sides of a powder carrier relative to gravity, wherein the powder carrier has a movement envelope intersecting a beam path extending from the illuminator towards the build platform and includes a material translucent to radiation emitted by the illuminator such that the emitted radiation traverses the powder carrier and fuses powder from a powder bed carried by the powder carrier with a substrate overlying the powder carrier and suspended from the build platform;
   a revolver operatively associated with the powder carrier to move the powder carrier between a first position and a second position;
   a processor operatively associated with the powder carrier and illuminator; and
   a memory communicative with the processor and having instructions recorded thereon that, when read by the processor, cause the processor to:
      move the powder carrier to the first position, the first position intersecting the beam path;
      fuse powder carried by the powder carrier with an overlying substrate;
      move the powder carrier to the second position, the second position outside of the beam path
      deposit powder with a first composition on the powder carrier prior to moving the powder carrier to the first position; and
      deposit powder with a second composition on the powder carrier subsequent to moving the powder carrier to the second position, wherein the powder first composition is different from the powder second composition.

2. A system as recited in claim 1, further including a conveyer operatively associated with the powder carrier to move the powder carrier between the first and second positions.

3. A system as recited in claim 1, further including a powder source proximate to the powder carrier second position and operatively associated with the powder carrier to deposit the powder bed on the powder carrier in the second position.

4. A system as recited in claim 1, further including an indexer coupled to the build platform to displace the substrate upwards relative to gravity as layers are successively added to the bottom of the substrate.

5. A system as recited in claim 1, wherein the illuminator further comprises a scanning mirror element disposed along the beam path and configured to selectively displace the beam path laterally across the substrate.

6. A system as recited in claim 1, wherein the illuminator further comprises a focus element disposed along the beam path and configured to focus radiation at a location disposed between the powder carrier and the build platform.

7. A system as recited in claim 1, wherein the illuminator further comprises a laser radiation source.

8. A system as recited in claim 1, wherein the powder carrier is a first powder carrier and further including at least one second powder carrier, wherein each of the first and the at least one powder carrier has first and second positions, the first position intersecting the beam path and the second position outside of the beam path.

9. An additive manufacturing system, comprising:
   a build platform;
   a powder carrier disposed below the build platform relative to gravity; and
   an illuminator disposed at an end of a beam path intersecting the powder carrier from below the powder carrier such that radiation emitted from the illuminator traverses the powder carrier and fuses powder from a powder bed carried by the powder carrier with a substrate overlying the powder carrier and suspended from the build platform
   a revolver operatively associated with the powder carrier to move the powder carrier between a first position and a second position;
   a processor operatively associated with the powder carrier and illuminator; and
   a memory communicative with the processor and having instructions recorded thereon that, when read by the processor, cause the processor to:
      move the powder carrier to the first position, the first position intersecting the beam path;
      fuse powder carried by the powder carrier with an overlying substrate;
      move the powder carrier to the second position, the second position outside of the beam path
      deposit powder with a first composition on the powder carrier prior to moving the powder carrier to the first position; and
      deposit powder with a second composition on the powder carrier subsequent to moving the powder carrier to the second position, wherein powder first composition is different from the powder second composition.

* * * * *